United States Patent [19]

Geary, Jr.

[11] 4,211,932
[45] Jul. 8, 1980

[54] POWER RECOVERY SYSTEM
[75] Inventor: Carl H. Geary, Jr., Greensburg, Pa.
[73] Assignee: Carrier Corporation, Syracuse, N.Y.
[21] Appl. No.: 903,461
[22] Filed: May 8, 1978
[51] Int. Cl.² .............................................. F02G 3/00
[52] U.S. Cl. ................................................... 290/52
[58] Field of Search ................................. 290/2, 52
[56] References Cited
U.S. PATENT DOCUMENTS

| 3,219,831 | 11/1965 | Ray et al. ............................ 290/52 X |
| 3,230,381 | 1/1966 | Grinnell et al. ................. 290/52 UX |
| 4,038,558 | 7/1977 | Gallois .................................... 290/52 |
| 4,117,344 | 9/1978 | Boerstler et al. ...................... 290/52 |

Primary Examiner—J. V. Truhe
Assistant Examiner—W. E. Duncanson, Jr.
Attorney, Agent, or Firm—J. Raymond Curtin; Barry E. Deutsch

[57] ABSTRACT

A power recovery system utilizing a relatively high temperature waste heat fluid to drive an expander. The expander is operatively connected to an electrical generator. A dynamic brake is connected to the expander to regulate the speed thereof when the expander is operating at other than steady state conditions.

10 Claims, 1 Drawing Figure

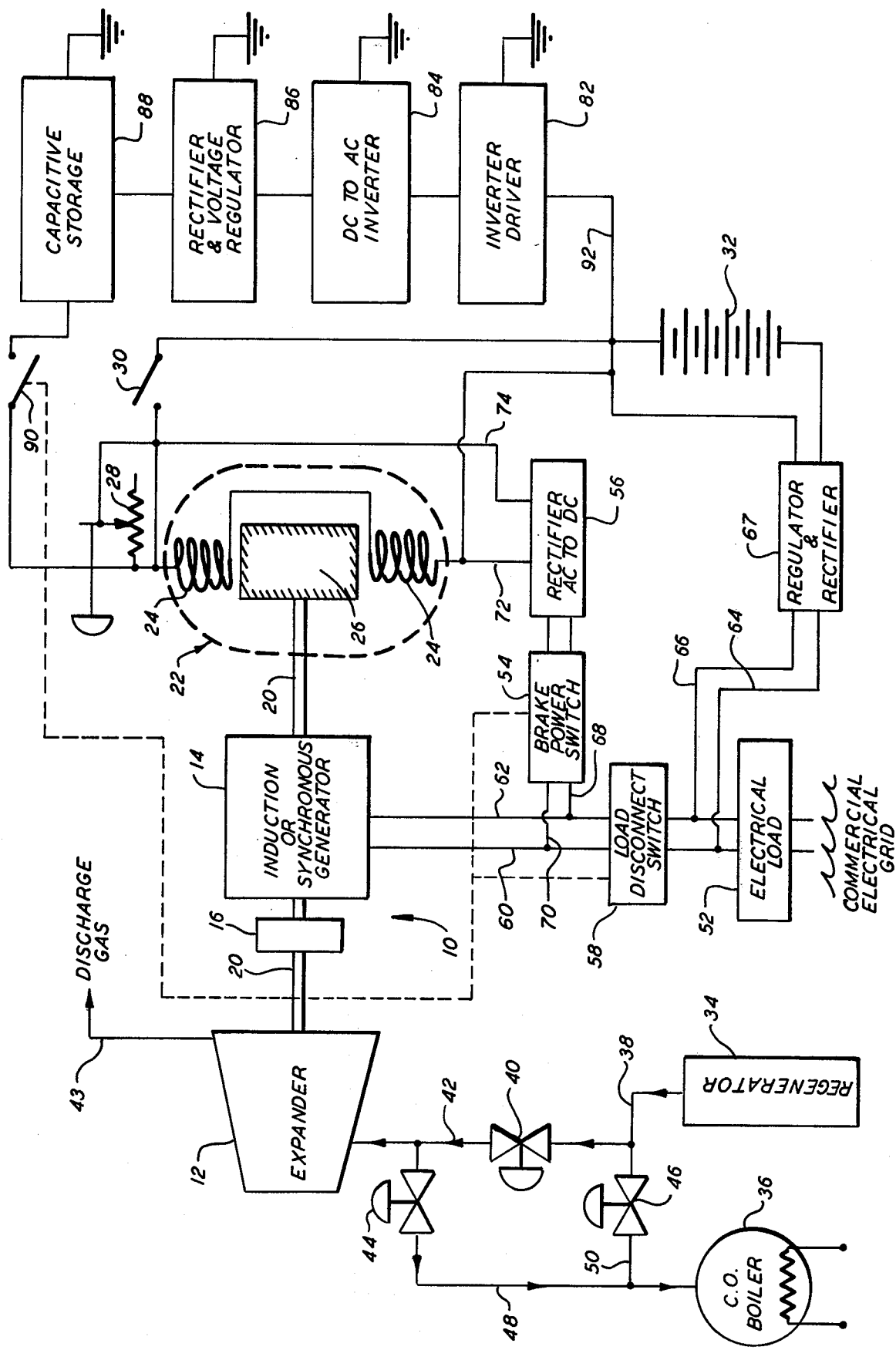

POWER RECOVERY SYSTEM

BACKGROUND OF THE INVENTION

This invention relates to a system for recovering power from a relatively high temperature waste heat fluid and in particular, to such a system utilizing a dynamic brake to control the speed of the expansion means employed in the power recovery system.

In many installations, such as refineries, the process utilized in the manufacture of a product results in the production of relatively high temperature waste heat fluids. As a result of the shortage of energy and the increased cost of fossil fuels, it is extremely desirable that the energy contained within the high temperature waste heat fluid be employed to generate usable power.

For example, in refineries employed a catalytic cracking process, substantial quantities of waste heat fluids are generated. The waste heat fluid in some instances has been employed to drive a turbomachine such as a fluid expander. The expander has heretofore been directly coupled to a compressor and operates as the prime mover therefor. The compressor is generally employed to provide substantial quantities of high pressure air required in the catalytic cracking process. As shall be more fully explained hereinafter, it has been necessary to directly connect the expander to the compressor to maintain a power absorbing load on the expander. It is understood that such direct connection might include a suitable speed changer where applicable.

However, many of the established refineries do not have the expander-compressor string affixed therein. In such refineries, it has been the general practice to employ an electric motor or steam turbine to drive the compressor. To provide an expander to utilize the energy of the waste heat fluid and directly drive the compressor would be extremely costly if attempted on a "retrofit" basis.

For example, refinery floor space is generally at a premium. Thus, in established plants, there is seldom ample available space in the vicinity of the compressor to locate the expander. Furthermore, it would be necessary to interrupt the process during the time when the compressor and expander were being mechanically connected. Generally, a process shutdown results in a severe economic penalty and thus is avoided if at all possible.

For the above reasons, it has not been deemed advisable to add an expander on a "retrofit" basis to established plants, such as refineries, even though the same would be extremely desirable from the standpoint of energy conservation and reduction of the operating costs of the process.

As previously noted, it has heretofore been necessary to have the expander directly connected to the compressor. The elimination of this requirement would permit the expander to be located wherever convenient. Additionally, the expander could be used to drive a generator rather than a compressor with the generator developing electrical power for uses in addition to driving the compressor's motor. The reason for such requirement may be readily observed from the following discussion. The waste heat fluid furnished to the expander is a high mass flow, low density, high specific volume fluid. Generally, the fluid is furnished through relatively large conduits, as for example 48 inch diameter pipes. Thus, upon an abrupt shutdown of the expander, whereby valves located upstream of the expander are closed to interrupt the flow of fluid thereto, a substantial volume of fluid is trapped between the shutoff valves and the inlet to the expander. It is highly imperative that the energy of the trapped fluid be dissipated without permitting the speed of the expander to exceed safe limits.

When the expander has been connected to a compressor, the compressor has operated as a power absorbing load which has enabled the expander to safely dissipate trapped energy. However, if the expander were employed to drive a generator and the electrical load on the generator were suddenly disconnected, the expander generator string might accelerate rapidly and exceed safe operating speeds due to the absence of a power absorbing load. The generator inertia would not, in the absence of an electrical load, prevent the expander string from obtaining unsafe speeds. Thus, expander-generator strings have always included compressors to insure that a power absorbing load is continuously attached to the expander.

In addition, in many process applications utilizing a power recovery expander, "afterburn" of the fluid may sometime occur, thereby increasing the energy level of the fluid supplied to the expander above design conditions. Due to the resulting excessive energy level of the waste heat fluid, it has been necessary to oversize the generator, of an expander-compressor-generator string, by as much as 20% to absorb the excess energy available in the fluid due to the occurrence of an "afterburn." This excess available energy must be absorbed by the generator, as the compressor's power absorbing capabilities are exceeded during "after-burn" conditions. By providing a 20% oversized generator, the generator normally operates inefficiently. As is obvious, it is desirable to reduce the generator's size to, not only reduce the manufacturing cost thereof, but also to increase the operating efficiency thereof.

Furthermore, it has heretofore been impracticable to utilize an expander to drive a synchronous generator. A synchronous generator is extremely speed sensitive. Due to the properties of the fluid delivered to the expander, the expander's speed could not be accurately controlled to permit the synchronous generator to be connected to a power supply grid.

U.S. Pat. No. 1,643,213 (Kane) discloses a steam turbine driving a generator. The turbine-generator string includes an electrical brake to govern the speed of the string to maintain substantially constant velocity and thus voltage output. The excitation of the brake coils is varied, depending on sensed speed changes, to maintain the desired constant velocity. Essentially, the brake functions to maintain a desired steady state speed.

The steam turbine disclosed in the Kane patent differs from the expander utilized in a waste heat power recovery system in many respects. The steam turbine generally receives steam at relatively high pressure, high density and low mass flow. If the load on a generator driven by such a turbine were suddenly removed, a valve located upstream of the turbine can be closed to terminate flow of steam to the turbine. The valve can be used since only a relatively small quantity of steam will be trapped between the valve and turbine inlet. The energy contained in the trapped steam can be readily dissipated, without accelerating the turbine-generator string to unsafe limits.

The expander used in a power recovery system, as noted previously receives a low pressure, high mass, low density fluid. Any trapped fluid will cause rapid acceleration of the expander-generator string. Thus, relatively slow acting valves cannot be used to prevent abrupt acceleration of the string upon a sudden removal of a power absorbing load. As noted previously, the system disclosed in the Kane patent operates as a governor for a steam turbine to maintain a steady state speed, whereas, with respect to an expander used in a power recovery cycle employing waste heat fluid, a system that can readily absorb power during transient conditions is required. The system disclosed in Kane, functioning as a governor for a steam turbine could not be directly used as a system to absorb power during transient operation of a power recovery expander.

Accordingly, it is a primary desideratum of the present invention to provide power absorbing means for an expander-generator string solely operable when the expander is operating at other than "steady state conditions." As used herein, the phrase "other than steady state conditions" shall mean during starting, during afterburn, during sudden loss of load, or during other comparable transient conditions which are other than normal steady state operation of the expander-generator string.

SUMMARY OF THE INVENTION

Accordingly, it is an object of this invention to recover the energy available in high temperature waste heat fluids in a more efficient and economical manner.

It is a further object of this invention to utilize waste heat fluids in a power generating system incorporating an expander driving a generator and having dynamic power absorbing means connected thereto.

It is a further object of this invention to provide a power generating system employing waste heat fluids which is suitable for retrofitting at present installations.

It is yet another object of this invention to utilize waste heat fluids to generate power via expansion of the fluid through a turbomachine, with the turbomachine being connected to a brake to regulate the speed of the turbomachine at other than steady state conditions.

These and other objects of the present invention are attained in a system for recovering power from a relatively high temperature waste heat fluid which includes expansion means to receive the relatively high temperature fluid. The expansion means is operatively connected to an electrical power generating means, with the expansion means driving the generating means as a result of the expansion of the high temperature fluid therethrough. Brake means is operably connected to the expansion means to regulate the speed of the expansion means when the expansion means is operating at other than steady state conditions.

BRIEF DESCRIPTION OF THE DRAWING

The single FIGURE of drawing schematically illustrates a system for recovering power from a relatively high temperature waste heat fluid in accordance with the present invention.

DESCRIPTION OF THE PREFERRED EMBODIMENT

Referring to the single figure of the drawing, there is schematically illustrated a power recovery system utilizing the dynamic power absorbing means of the present invention. In particular, power recovery system 10 includes an expander 12 coupled through a suitable speed reducing mechanism 16 to an electrical generator 14 which may either be an induction or synchronous generator. The expander and generator are axially aligned and include a shaft 20 coupled to a dynamic power absorbing mechanism 22.

The power absorbing mechanism 22 is preferably an eddy current brake having excitation coils 24. Coils 24 are operatively engaged with a brake drum 26 mounted on the end of the shaft. The coils are energized by the supply of DC electrical power thereto to activate the eddy current brake. Eddy current brakes of the type described are manufactured and sold by the Eaton Corporation under the registered trademark "Dynamatic".

The control system for brake 22 includes a variable resistor 28 or other suitable controller which regulates the magnitude of the DC voltage furnished to coils 24. The strength of the brake is a function of the magnitude of the DC voltage supply. A switch 30 is connected in series with variable resistor 28 to selectively supply the DC voltage to the coils from a suitable DC source, such as battery pack 32. The battery provides a DC voltage, for example 90 volts, to the coils through variable resistor 28. As shall be more fully explained hereinafter, generator 14 may serve as a source of DC power in lieu of battery pack 32. The utilization of generator 14 as the DC power source will produce regenerative braking.

Expander 12 is provided with a source of relatively high temperature waste heat fluid through inlet conduit or line 42. The waste heat fluid is expanded through device 12 and exits therefrom through conduit 43. Valve 40 is disposed in line 42 upstream from expander 12. Additionally, valves 44 and 46 are respectively disposed in lines 48 and 50 for a reason to be more fully explained hereinafter.

There are many known processes which produce relatively high temperature waste heat fluid which may be satisfactorily employed to generate electrical power as a result of the recovery of the energy contained within the fluid. One such process is involved in oil refinery installations and is known as a catalytic cracking process. In such a process, the waste heat fluid is developed in a regenerator 34 which communicates with line 42 via line 38.

The flow of waste heat fluid from regenerator 34 through lines 38 and 42 to expander 12 and the expansion of fluid therethrough, results in operation of the expander and consequently, the generator connected thereto. The generator delivers electrical power through electrical conductors 60 and 62 to an electrical load, represented by reference numeral 52. The electrical load may include the electric motor employed to drive a compressor and may also include other electrically operated components in the plant, or in some instances, may include the commercial grid served by a public utility. A load disconnect switch 58 is interposed in conductors 60 and 62 to remove the electrical load from the expander-generator string 12, 14.

During normal operation of the generator, electrical energy is supplied via lines 64 and 66 through a regulator and rectifier 67 to battery pack 32 to continuously charge the battery pack. Alternatively, if the generator is inoperative, the battery pack may be charged from the commercial grid.

A brake power switch 54 is interposed in lines 68 and 70. Lines 68 and 70 furnish electrical power from lines 60 and 62 through a regulator and rectifier 56 and electrical conduits 72 and 74, to coils 24 of eddy current brake 22 for a reason to be more fully explained hereinafter.

Additionally, the control for brake 22 may include an inverter driver 82, a D.C. to A.C. inverter 84, a voltage regulator and rectifier 86, a capacitive storage bank 88, and a switch 90. These electrical elements are connected to battery pack 32 via electrical conductor 92. Elements 82, 84 and 86 multiply the D.C. voltage available from source 32 by a relatively large factor, as for example by a factor of ten. Capacitive storage bank 88 retains the amplified D.C. voltage and feeds same to coils 24 upon closure of switch 90. Switch 90 immediately closes upon the opening of switch 58.

As noted previously, it is extremely important, due to the fossil fuel shortage and the increased cost of fossil fuels, that power be obtained from normally unused energy sources. In many refineries or other applications, high pressure gas, as for example air, is required to support the manufacturing process of the installation. Typically, a compressor used to provide the high pressure gas, is driven by an electrical motor furnished with electrical energy from a power utility. In order to reduce the operating cost of the process and in addition, reduce the load requirements on the utility, it is extremely desirable that the installation generate as much of its own electrical power as is possible. The present invention permits an expander-generator string to be situated at a point remote from the compressor and furnish electrical power to the compressor motor. Thus, since the string may be positioned at a remote location, a minimum disruption of the actual process will occur when the string is retrofitted into an already existing installation.

Heretofore, it has been necessary to utilize the compressor as a power absorbing load on the expander to prevent the expander from operating above safe speeds. In essence, this has mandated that the compressor be directly coupled to the expander. Thus, the typical installation has included an expander, compressor and generator coupled together on a common shaft, with the expander driving both the compressor and generator. The generator has been limited to those of the induction type, as synchronous generators are extremely speed sensitive. Prior to the present invention; the inability to regulate the speed of the expander within a very small range has prevented users from obtaining the fine speed control that is a prerequisite for synchronizing the speed of a synchronous generator before the generator is connected to an electrical load, such as the public power grid.

Furthermore, very often in processes producing relatively high temperature waste heat fluid, a phenomenon called "afterburn" occurs which results in the temperature of the waste heat fluid rising substantially above normal operating conditions. The extra energy thus contained within the waste heat fluid has to be dissipated within the expander. Thus, where a generator has heretofore been coupled to the expander, it has been necessary to oversize the generator by as much as 20% so that the generator produces an adequate load on the expander to absorb the extra power produced during afterburn conditions. In the absence of the oversized generator, the generator must be disconnected from the grid otherwise an electrical overload of the generator will occur. As is obvious, in employing an oversized generator, the generator normally runs at less than its optimum design conditions resulting in inefficient performance of the generator. In addition, the oversized generator increases the manufacturing costs of the expander-generator string.

In order to overcome the above-mentioned difficulties, the present invention includes a power absorbing brake operable when the expander is operating at other than normal operating conditions. As used herein, the phrase "other than normal operating conditions" shall include starting conditions, sudden unloading of the generator, and afterburn conditions all of which are transient, as opposed to steady-state, conditions.

During normal operation, the relatively high temperature waste heat fluid flows through lines 38, valve 40, and line 42 to expander 12. Should it be necessary to suddenly disconnect the generator from the electrical load, it becomes necessary to immediately shutdown expander 12; valve 40 is closed, and valves 44 and 46 are opened. This results in the flow of fluid being directed through line 38, valve 46 and line 50 to a boiler 36. In addition, since valve 44 is opened, the relatively high temperature waste heat fluid captured between valve 40 and the expander 12 will escape. However, since mechanical actions are required to move the various valves in the desired sequence, a delay of two to three or sometimes even more seconds will occur before flow of fluid to the expander is actually terminated. During this relatively short period of time, the expander string may accelerate beyond safe operating speeds. Such an abrupt increase in the speed of the expander results from the high mass flow, high specific volume properties of the fluid. In addition, there will be a relatively large trapped volume of the fluid between valve 40 and the expander due to the size of conduit 42; for example 48 inch diameter pipe is employed to deliver the fluid to the expander. Before valve 44 can fully open to exhaust the fluid, the fluid will enter the expander. Since the generator is "unloaded," the expander will accelerate very rapidly as the fluid continues to expand therethrough.

In order to prevent the uncontrolled acceleration of expander 12 when switch 58 opens, brake switch 54 or switch 90 is immediately closed to place a DC voltage on coils 24. The DC voltage furnished to the coils may be obtained from generator 14 or from storage bank 88. If obtained from generator 14, the voltage is delivered through electrical conductors 60 and 62, 68 and 70 and 72 and 74 to coils 24. By utilizing the electrical energy produced by generator 14 to activate brake 22, a regenerative braking system is obtained. Variable resistor 28 can be selectively controlled to permit a maximum D.C. voltage to flow to coils 24 of brake 22. The eddy current brake has a characteristic that the brake torque produced is a function of the DC voltage applied to the coils. By permitting a maximum voltage signal to flow to coils 24, a relatively high brake torque can be produced in a matter of a few milliseconds. In practice, a step-up transformer may be added to the circuit to increase the magnitude of the DC voltage applied to coils 24 by some relatively large factor, as for example by a factor of ten. This, in turn, will increase the available brake torque to ten times maximum rating of the brake. The brake can operate at ten times its maximum rated torque for a substantially greater period of time than that required to insure that the energy contained within the trapped gas will be dissipated. By energizing brake 22, a positive load is maintained on the expander-generator string to prevent the expander from accelerating beyond safe operating speeds.

As noted previously, the voltage supplied from capacitive storage bank 88 will also have been increased by a relatively large factor. Switch 90 may be closed in lieu of switch 54 to connect the storage bank directly to coils 24. The use of the regenerative braking system can be established as "normal operation", with the use of the battery pack as the source of D.C. voltage being available as an emergency backup.

Switch 30 can be closed to provide the necessary DC excitation to coils 24 from battery pack 32 upon startup. By connecting coils 24 with battery pack 32, the necessary excitation of the coils will be obtained. Resistor 28 can be suitably regulated to adjust the voltage furnished to coils 24, whereby the speed of the expander may be suitably regulated.

Although it is desirable to place a maximum brake torque on shaft 20 when the load on generator 14 is suddenly disconnected, it is only desirable to place a portion of the available torque on shaft 20 during the occurrence of an afterburn. When such an occurrence is sensed, as for example through suitable temperature responsive means to sense the temperature of the fluid flowing to expander 12, switch 30 may be closed to energize coils 24 of brake 22. A fixed voltage signal can be supplied to the coils to establish a brake torque of a predetermined magnitude to absorb the extra power developed by expander 12 as a result of the addition of excessive energy to the waste heat fluid due to the occurrence of the afterburn.

If generator 14 is of the synchronous type, eddy current brake 22 is further operable to bring the expander and generator to synchronous speed to enable an operator to connect the expander-generator string with the load. During startup of the expander-generator string, variable resistor 28 can be adjusted to control the magnitude of the DC voltage to coils 24 to fine tune the speed of the expander. In effect, by varying the brake torque acting on shaft 20, the speed of the generator-expander string may be readily controlled. While various combinations of controls have been specifically described, other control arrangements may also be used to achieve the benefits of the present invention.

As may be readily observed, the power absorbing means 22 of the present invention achieves a multiplicity of functions in that it provides a fine tune speed control when expander 12 is driving a synchronous generator. In addition, brake 22 eliminates the need for the expander to be directly coupled to a compressor. The brake provides a readily available source to absorb power on an instantaneous basis should the normal load be abruptly disconnected from the expander-generator string. Furthermore, dynamic power absorbing means 22 eliminates the need to oversize a generator coupled to the expander to provide means to dissipate the additional energy contained within the motivating fluid upon the occurrence of an afterburn.

Power absorbing means 22 effectively provides all the functions of the hereinabove described apparatus. It should be specifically understood that although system 10 has been specifically described relative to a catalytic cracking process, the present invention should not be limited thereto but may be satisfactorily employed in any other process wherein a relatively high temperature waste heat fluid is used as a source of energy. Furthermore, although an eddy current brake has been specifically illustrated, it should be understood other forms of brakes, for example, water and friction brakes, may be employed within the spirit of the invention. Furthermore, other types of selectively operable power absorbing means may also be equally employed, as for example, selectively coupling a fly-wheel to the expander-generator string during transient conditions.

While a preferred embodiment of the present invention has been described and illustrated, the invention should not be limited thereto, but may be otherwise embodied within the scope of the following claims.

I claim:

1. A system for recovering power from a relatively high temperature high mass flow, low pressure, low density, high specific volume waste heat fluid formed directly from the combustion of a process gas comprising:
   expansion means to receive said relatively high temperature waste heat fluid;
   electrical power generating means connected to said expansion means and operated thereby as a result of the expansion of the fluid therethrough; and
   dynamic power absorbing means intermittently connected to said expansion means for applying a brake torque acting thereon for intercepting acceleration of said expansion means above a predetermined magnitude when said expansion means is operating other than at steady state conditions.

2. A system in accordance with claim 1 wherein said dynamic power absorbing means is an eddy current brake.

3. A system in accordance with claim 2 wherein said eddy current brake includes coils, with said electrical power generating means supplying electrical energy to said coils.

4. A system in accordance with claims 1 or 2 wherein said power absorbing means regulates the speed of said expansion means during startup or sudden loss of load of said expansion means.

5. A system for recovering power from a relatively high temperature high mass flow, low pressure, low density, high specific volume waste heat fluid formed directly from the combustion of a process gas comprising:
   expansion means to receive said high temperature fluid with the flow of fluid through said expansion means resulting in operation thereof;
   electrical power generating means connected to said expansion means;
   eddy current brake means including a coil connected to said expansion means for intermittently placing a power absorbing load thereon for intercepting acceleration of said expansion means above a predetermined magnitude, said coil being energized to activate said brake means; and
   means responsive to a predetermined operational state of said expansion means to furnish electrical power to said coil to energize said brake means to place said power absorbing load on said expansion means.

6. A system in accordance with claim 5 wherein said electrical power generating means furnishes said electrical power to said coil.

7. A system in accordance with claim 6 wherein said responsive means is activated in response to an overspeed condition of said expansion means.

8. A system in accordance with claims 5 or 6 further including load means to receive the electrical power generated by said generating means, and disconnect means interposed between said load and said electrical power generating means to remove said load from said generating means, with said responsive means being activated upon operation of said disconnect means.

9. A method of recovering power from a relatively high temperature high mass flow, low pressure, low density, high specific volume waste heat fluid formed directly from the combustion of a process gas comprising the steps of:
  expanding the waste heat fluid through a turbomachine;
  generating electrical power as a result of the expansion of the fluid; and
  intermittently applying a brake torque acting on the turbomachine for intercepting acceleration of the turbomachine above a predetermined magnitude when the machine is operating other than at steady state conditions.

10. A method for recovering power in accordance with claim 9 wherein the electrical power employed to activate the brake is generated as a result of the expansion of the fluid.

* * * * *

UNITED STATES PATENT AND TRADEMARK OFFICE
CERTIFICATE OF CORRECTION

PATENT NO. : 4,211,932             Page 1 of 2
DATED      : July 8, 1980
INVENTOR(S) : CARL H. GEARY, JR.

It is certified that error appears in the above-identified patent and that said Letters Patent are hereby corrected as shown below:

The sole sheet of drawing and the drawing figure appearing on the title page should be deleted to appear as shown below:

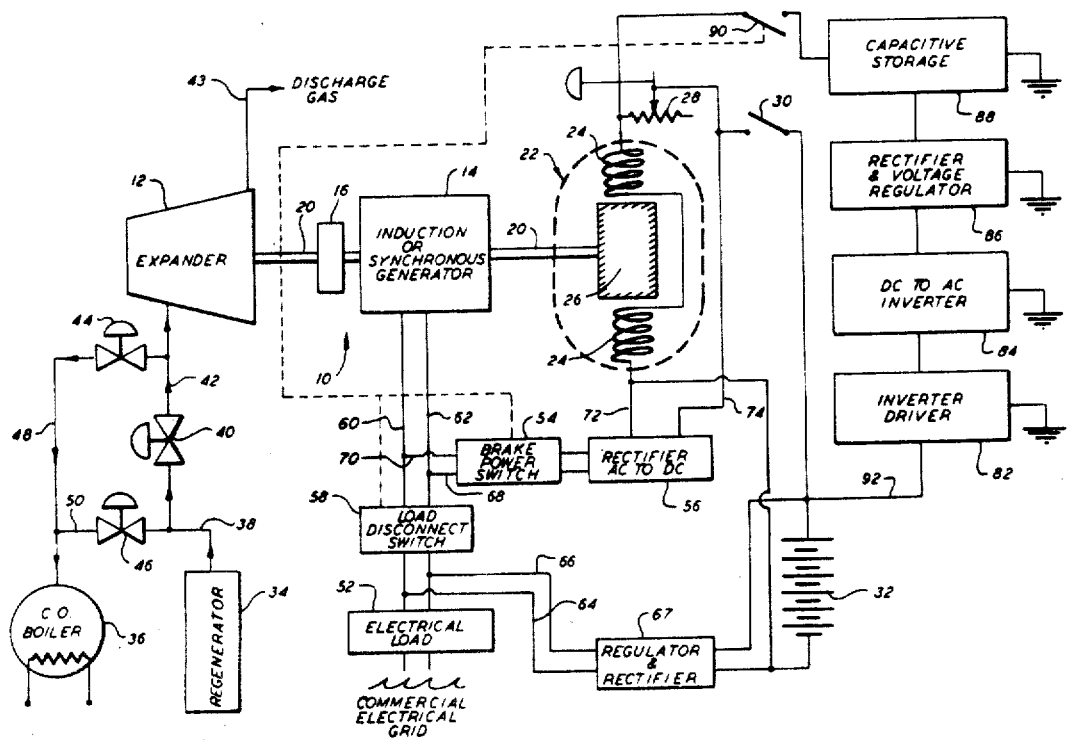

UNITED STATES PATENT AND TRADEMARK OFFICE
CERTIFICATE OF CORRECTION

PATENT NO. : 4,211,932

DATED : July 8, 1980

INVENTOR(S) : CARL H. GEARY, JR.

It is certified that error appears in the above–identified patent and that said Letters Patent are hereby corrected as shown below:

Column 1, line 17, change "employed" to --employing--.

Signed and Sealed this

Seventh Day of October 1980

[SEAL]

Attest:

SIDNEY A. DIAMOND

Attesting Officer

Commissioner of Patents and Trademarks